(12) United States Patent
Mitsui

(10) Patent No.: US 8,714,822 B2
(45) Date of Patent: May 6, 2014

(54) OPENING/CLOSING MECHANISM

(75) Inventor: Yasuhiro Mitsui, Chiba (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 0 days.

(21) Appl. No.: 13/808,638

(22) PCT Filed: Jun. 30, 2011

(86) PCT No.: PCT/JP2011/065036
§ 371 (c)(1),
(2), (4) Date: Jan. 7, 2013

(87) PCT Pub. No.: WO2012/005162
PCT Pub. Date: Jan. 12, 2012

(65) Prior Publication Data
US 2013/0108196 A1  May 2, 2013

(30) Foreign Application Priority Data

Jul. 9, 2010  (JP) .................................. 2010-156781

(51) Int. Cl.
*F16C 17/26* (2006.01)

(52) U.S. Cl.
USPC ............................................. 384/26; 384/35

(58) Field of Classification Search
CPC .. H04M 1/0235; H04M 1/0237; G06F 1/1624
USPC ................. 384/26, 35, 37, 41, 42; 455/575.3, 455/575.4
See application file for complete search history.

(56) References Cited

U.S. PATENT DOCUMENTS

| | | |
|---|---|---|
| 2009/0061963 A1 | 3/2009 | Miyaoka |
| 2010/0188350 A1 | 7/2010 | Sawada |
| 2011/0007465 A1 | 1/2011 | Naito |

FOREIGN PATENT DOCUMENTS

| | | |
|---|---|---|
| EP | 2120426 A1 | 11/2009 |
| EP | 2175619 A1 | 4/2010 |
| JP | 2008-301244 | 12/2008 |
| JP | 2009-059102 | 3/2009 |
| JP | 2009-071588 | 4/2009 |
| JP | 2009-158630 | 7/2009 |
| WO | WO 2009/110454 | 9/2009 |

OTHER PUBLICATIONS

International Search Report mailed on Jul. 26, 2011.
Extended European search report dated Dec. 5, 2013.

*Primary Examiner* — Phillip A Johnson
(74) *Attorney, Agent, or Firm* — IPUSA, PLLC

(57) ABSTRACT

An opening/closing mechanism enabling a first housing and a second housing to open to a so-called fully flat state includes a fixed plate that is fixed to a first housing, a moving plate that is fixed to a second housing, an intermediate member that is slidably coupled to the fixed plate by way of a first slide mechanism, a slide member that is slidably coupled to the intermediate member by way of a second slide mechanism, and a raising/lowering mechanism that raises/lowers the moving plate relative to the slide member.

5 Claims, 17 Drawing Sheets

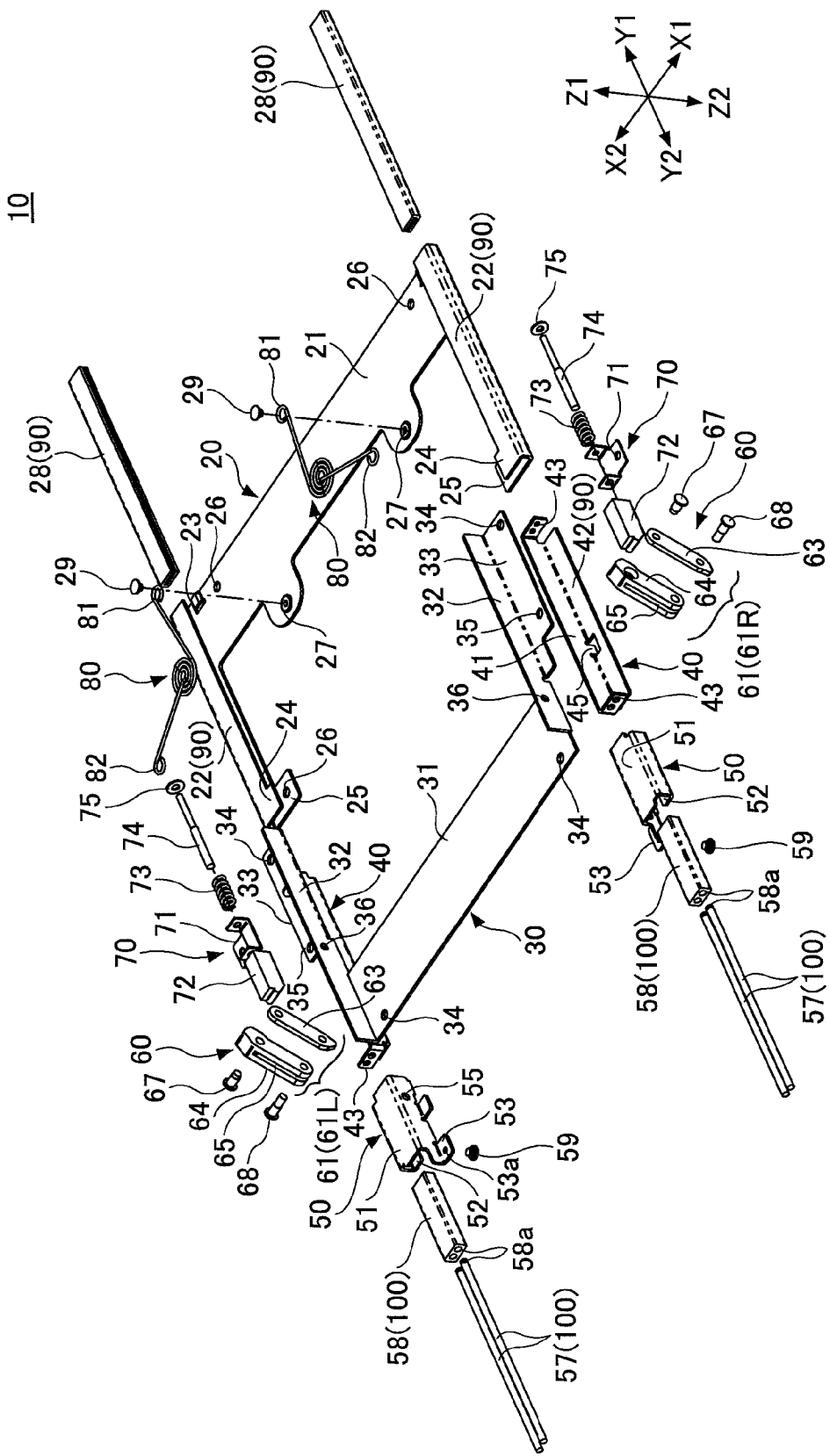

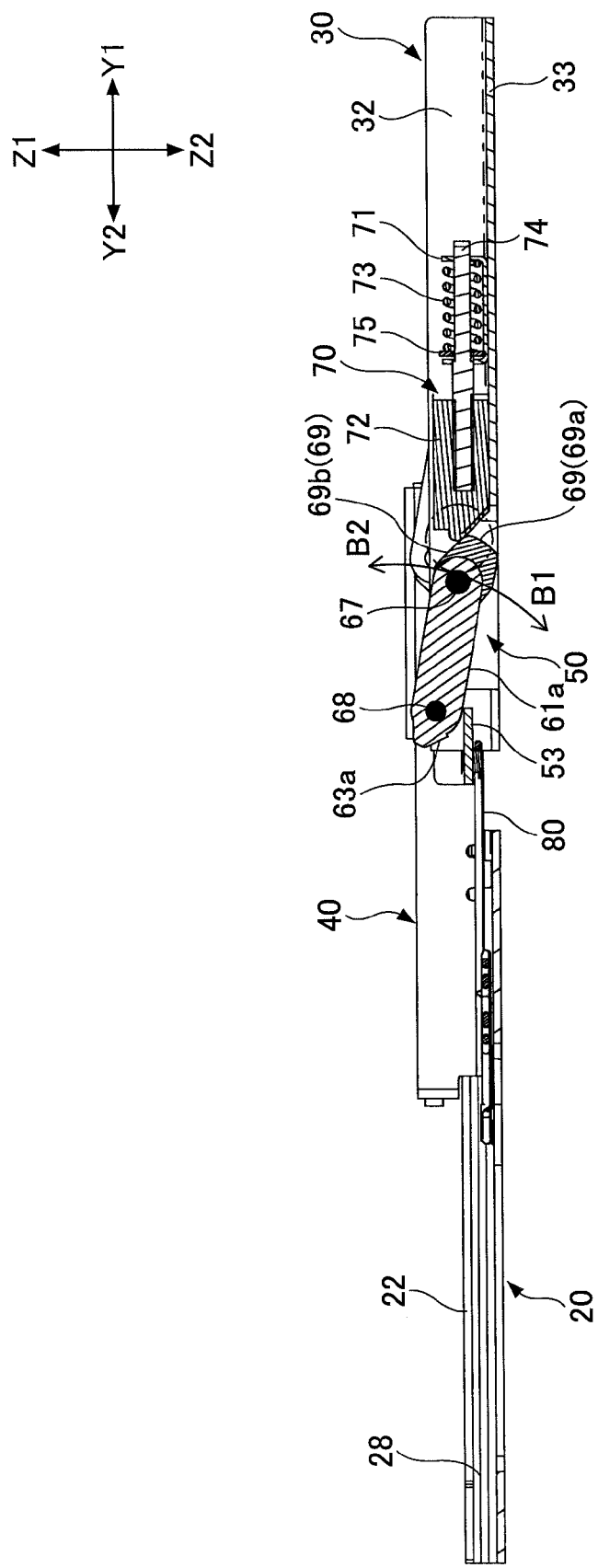

OPENING/CLOSING MECHANISM

TECHNICAL FIELD

The present invention relates to an opening/closing mechanism, and particularly, an opening/closing mechanism enabling a first housing and a second housing to open to a so-called fully flat state.

BACKGROUND ART

A portable terminal apparatus such as a portable terminal device typically includes a first housing having ten-keys or the like provided thereto and a second housing having a liquid crystal display device provided thereto and being openable and closable relative to the first housing. As for typical structures for opening and closing the second housing relative to the first housing, there is a type which opens and closes by connecting the first and the second housings with a hinge mechanism and rotating the second housing relative to the first housing (collapsible type) and a type which opens and closes by sliding the second housing relative to the first housing (slidable type).

Meanwhile, in recent years, portable terminal devices are being provided with more functions, devices capable of receiving digital terrestrial broadcast are being provided, and the size of liquid crystal display devices are becoming larger. Along with the providing of more functions, the number of keys on a keyboard for performing an input process on the portable terminal device is increasing. Therefore, the size of the keyboard tends to become larger. Although improvement of portability of the portable terminal device is being demanded constantly, there is a limit in increasing the size of the liquid crystal display device or the keyboard.

In a state where the collapsible type portable terminal device is in a collapsed state, its liquid crystal display device becomes hidden. This leads to a problem where the liquid crystal display device cannot be used in the collapsed state. Although the problem of the collapsible type portable terminal device does not occur in the slidable type portable terminal device, generation of an overlapped portion between the first and the second housings is unavoidable when in an open state. This leads to a problem of being unable to utilize space efficiently.

Accordingly, there is proposed an opening/closing mechanism having first and second housings arranged on the same plane (full flat) when the first and the second housings are in an open state (see Patent Document 1, 2). With this configuration, the liquid crystal display device can be used even when the first and the second housings are in a closed state. In addition, there is no overlapped part between the housings, and space can be efficiently utilized in a state where the first and the second housings are in an open state.

RELATED ART REFERENCE

Patent Document

Patent Document 1: Japanese Laid-Open Patent Publication No. 2009-059102
Patent Document 2: Japanese Laid-Open Patent Publication No. 2009-071588

DISCLOSURE OF THE INVENTION

Problem to be Solved by Invention

The opening/closing mechanism disclosed in Patent Documents 1, 2 have first and second housings connected with one or two links (coupling arm). However, the coupling arm is set to be short due to the configuration in which the second housing slides relative to the first housing. Further, in a case of raising/lowering the second housing relative to the first housing, the second housing moves up and down relative to the first housing by rotation of the coupling arm.

Accordingly, because the coupling arm is set to be short, a curved clearance part is required to provided in each corner of the first and second housing that face each other during a raising/lowering operation, so that the housings do not collide (see FIG. 4 of cited document 1). Thereby, a liquid crystal display device or a keyboard cannot be placed in a portion where the clearance part is provided. This leads to a problem of inefficient use of space.

Further, in a case of raising/lowering the second housing relative to the first housing, the coupling arm is configured to connect only to an end part of the second housing. Thus, there is a possibility that the second housing is rotated relative to the coupling arm. In a case where this rotation occurs, the second housing becomes inclined mainly at a position in which the second housing is coupled to the coupling arm. This leads to a problem of being unable to performing opening/closing while maintaining a horizontal state.

Means for Solving Problem

It is a general object of the present invention to provide an improved useful opening/closing mechanism that solves the above-described problems of the related art.

It is a specific object of the present invention to provide an opening/closing mechanism that can increase efficiency of using the space of the first and second housings and also stabilize their movement.

In order to achieve such object, the present invention provides an opening/closing mechanism characterized by including a fixed plate that is fixed to a first housing, a moving plate that is fixed to a second housing, an intermediate member that is slidably coupled to the fixed plate by way of a first slide mechanism, a slide member that is slidably coupled to the intermediate member by way of a second slide mechanism, and a raising/lowering mechanism that raises/lowers the moving plate relative to the slide member.

Further, with the present invention, the raising/lowering mechanism may include an arm having one end part rotatably connected to the slide member and another end part rotatably connected to the moving plate, wherein the moving plate is configured to be raised/lowered by the arm being rotated less than or equal to 90 degrees.

Further, with the present invention, there may be further included a shaking prevention mechanism that restricts displacement of the moving plate relative to the slide member when an upper surface of the first housing and an upper surface of the second housing become flush as the moving plate is lowered.

Further, with the present invention, there may be further included a shaking prevention mechanism including a first cam part that is provided toward the other end part of the arm, a second cam part that is arranged facing the first cam part, and a stopper provided in the slide member, wherein a movement of the moving plate relative to the slide member in a closing direction may be restricted by an engagement of the first cam part and the second cam part, and a movement in an opening direction is restricted by an engagement of a part of the raising/lowering mechanism and the stopper, wherein a displacement of the moving plate relative to the slide member may be restricted when an upper surface of the first housing and an upper surface of the second housing become flush as the moving plate is lowered.

Further, with the present invention, there may be further included an elastic urging part that is provided between the fixed plate and the slide member.

Effect of the Invention

With the present invention, dead space for an opening/closing movement of first and second housings can be prevented from being created and the second housing can be stably opened and closed relative to the first housing.

BRIEF DESCRIPTION OF THE DRAWINGS

FIG. 2 is a exploded perspective view of an opening/closing mechanism according to an embodiment of the present invention;

FIG. 11C is a diagram for describing a raising/lowering mechanism and a shaking prevention mechanism in an open state.

Figure 1:
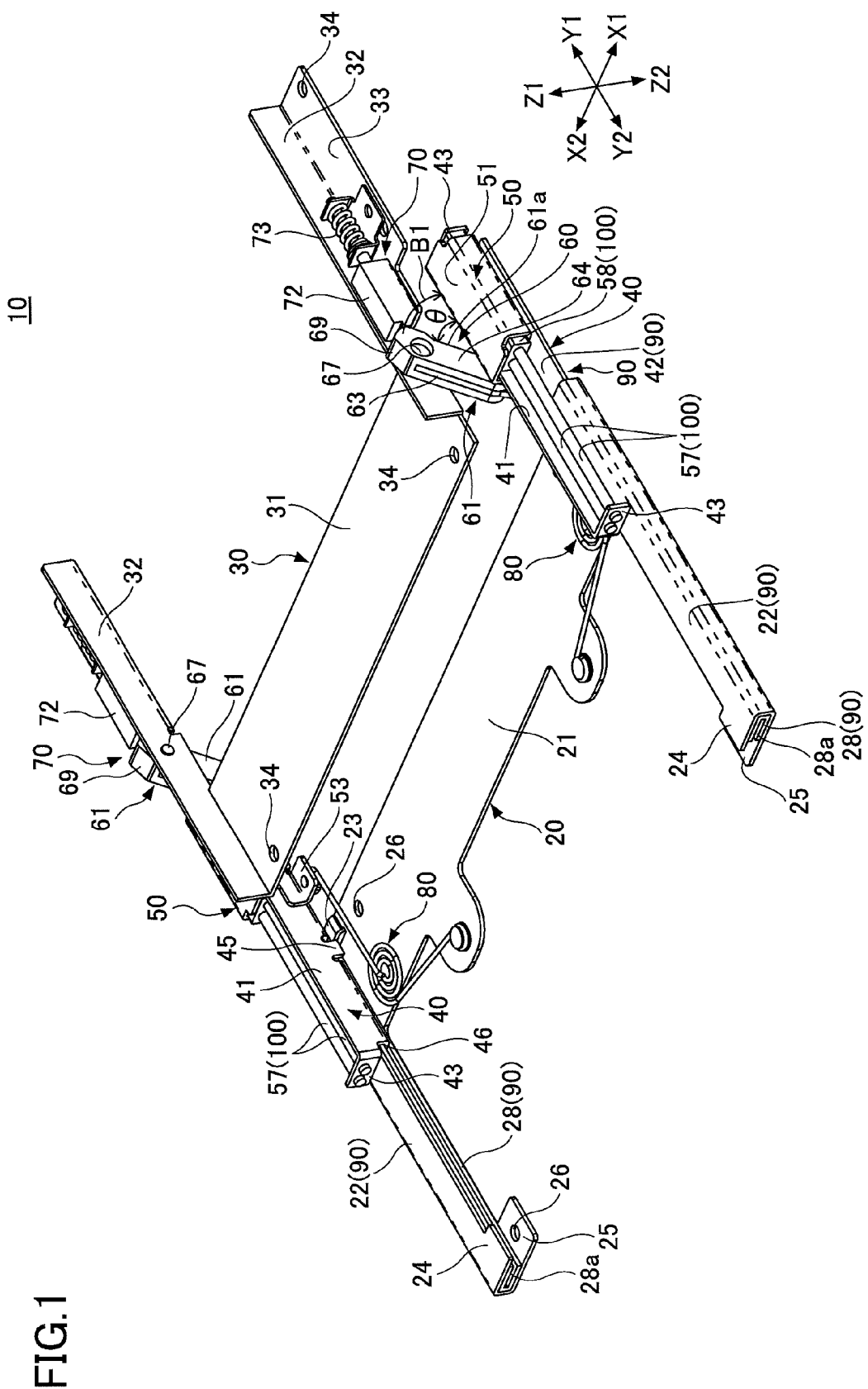
FIG. 1 is a perspective view of an opening/closing mechanism according to an embodiment of the present invention.
Figure 3A:
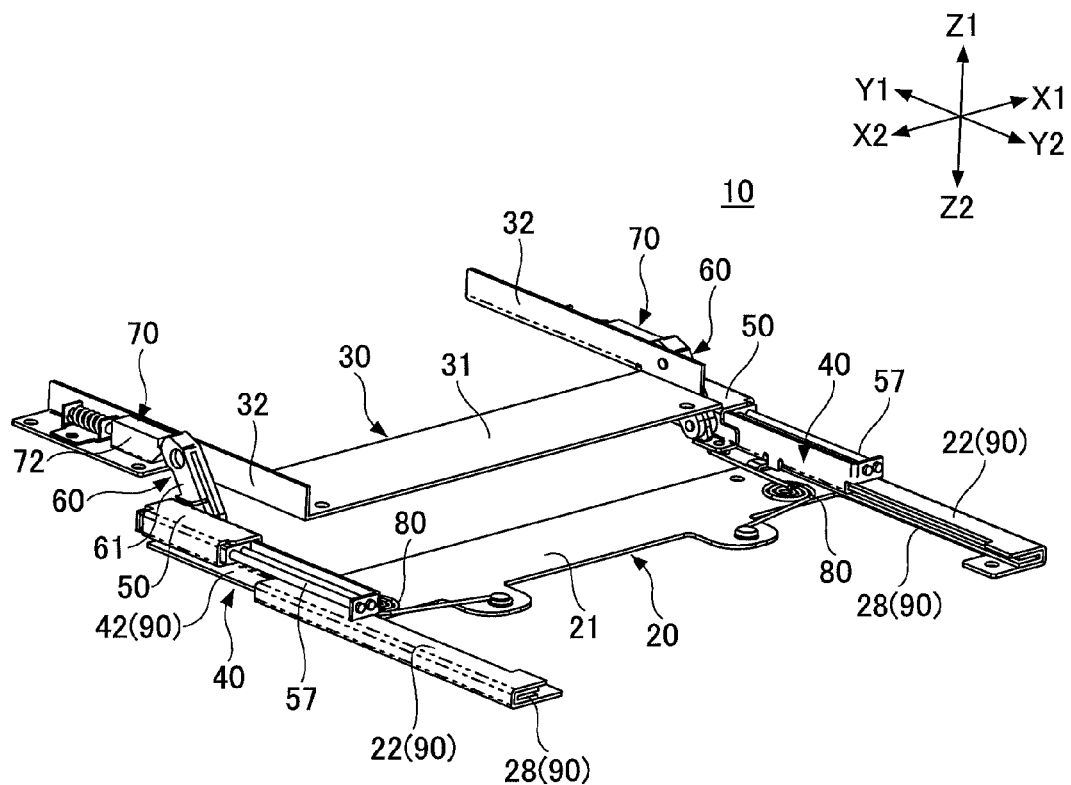
FIG. 3A is a perspective view of a slide-completed state of an opening/closing mechanism when viewed from above according to an embodiment of the present invention.
Figure 3B:
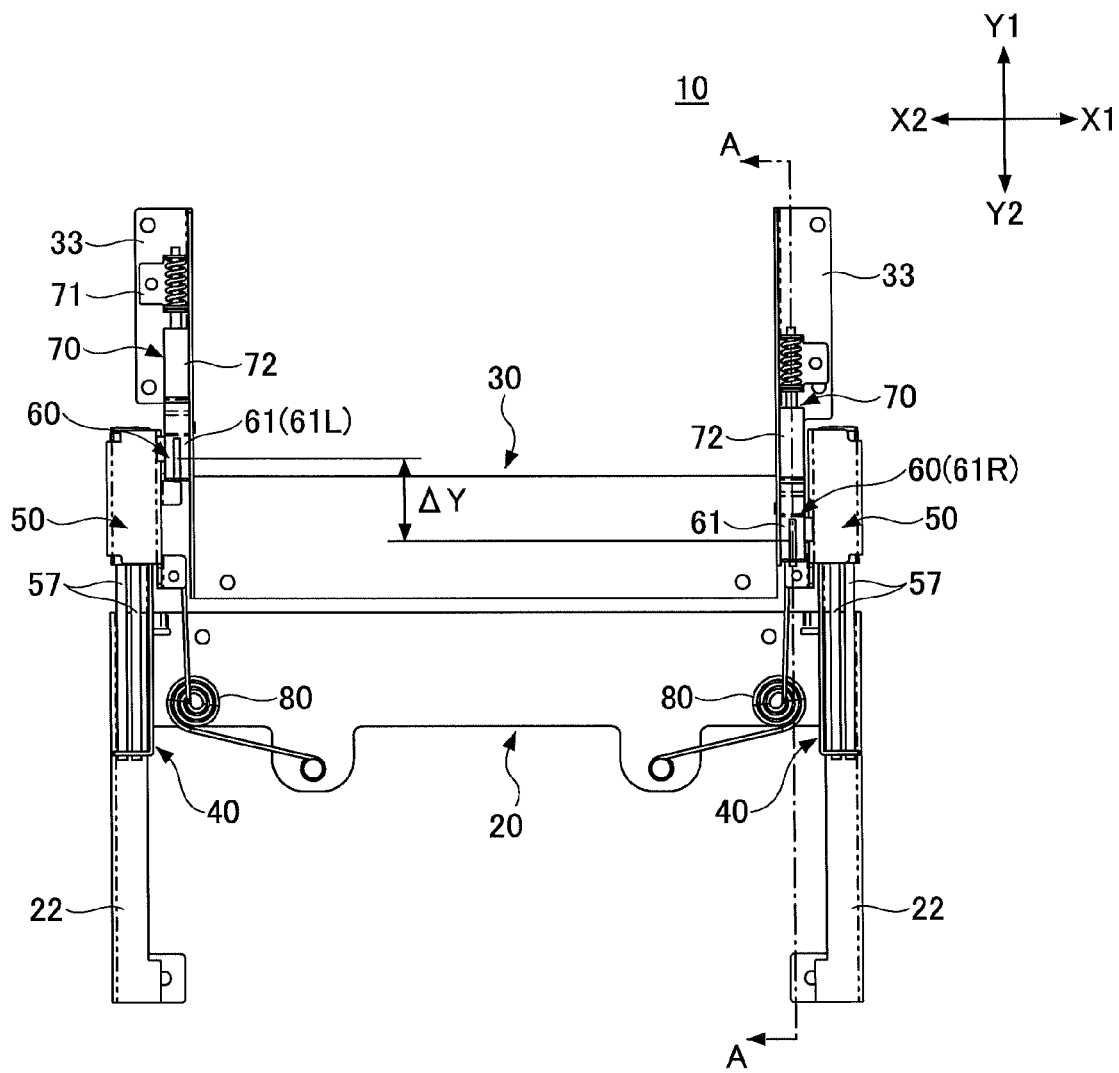
FIG. 3B is a plan view illustrating a slide-completed state of an opening/closing mechanism according to an embodiment of the present invention.

EXPLANATION OF REFERENCE NUMERALS 1 electronic device
2 first housing
3 second housing
10 opening/closing mechanism
20 fixed plate
21 main body part
22 C-shaped arm
23 first slide stopper
24 second slide stopper
26 fixing pawl
28 guide member
29 spring fixing screw
30 moving plate
31 main body part
32 extending arm
33 horizontal extending part
36 shaft hole
40 intermediate member
41 base part
42 slide part
43 shaft fixing part
45 stopper pawl
46 stopper part
50 stopper
51 main body part
53 rotation stopper
55 shaft hole
57 slide shaft
58 guide member
59 spring fixing screw
60 raising/lowering mechanism
61 raising/lowering arm
63 metal arm part
63a lower end flat part
64 resin arm part
67, 68 shaft pin
69 first cam part
70 shaking prevention mechanism
71 bracket
72 second cam part
73 spring
74 shaft
80 torsion spring
90 first slide mechanism
100 second slide mechanism

EMBODIMENTS OF THE INVENTION

In the following, embodiments of the present invention are described with reference to the accompanying drawings.

FIGS. 1 to 4 are diagrams for describing an opening/closing mechanism 10 according to a first embodiment of the present invention. FIG. 1 is a perspective view of the opening/closing mechanism 10. FIG. 2 is an exploded perspective view of the opening/closing mechanism 10. FIG. 3A is a perspective view of a slide-completed state of the opening/closing mechanism 10 when viewed from a direction different from FIG. 1. FIG. 3B is a plan view of the slide-completed state of the opening/closing mechanism 10. FIG. 4A is a perspective view of an open state of the opening/closing mechanism 10 when viewed from a lower part. FIG. 4B is a plan view of an open state of the opening/closing mechanism 10 (the slide-completed state and the open state are described below).

Figure 8A:
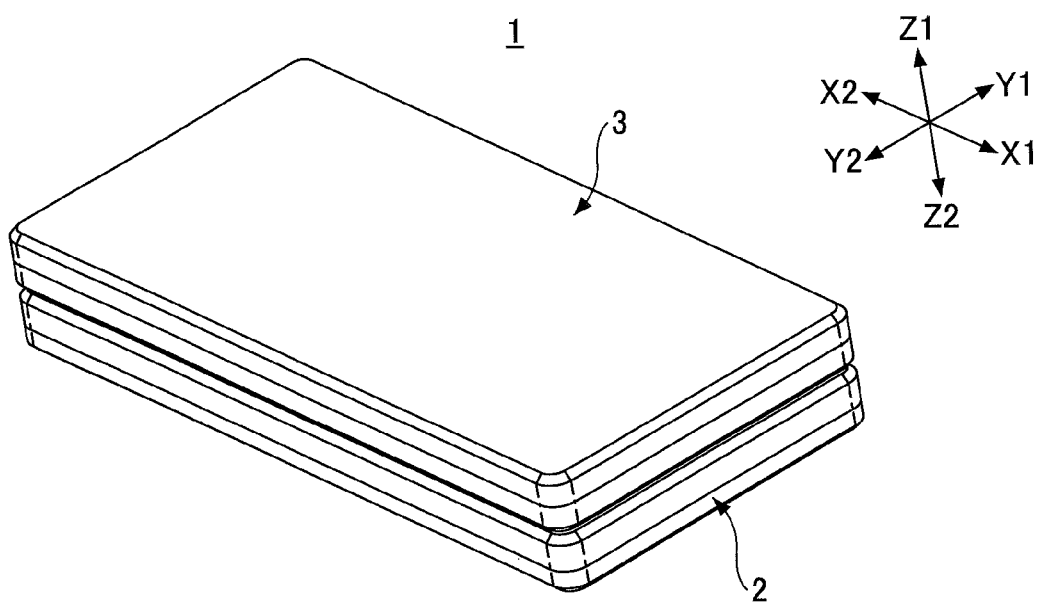
FIG. 8A is a perspective view illustrating a closed state of an electronic device.
Figure 10A:
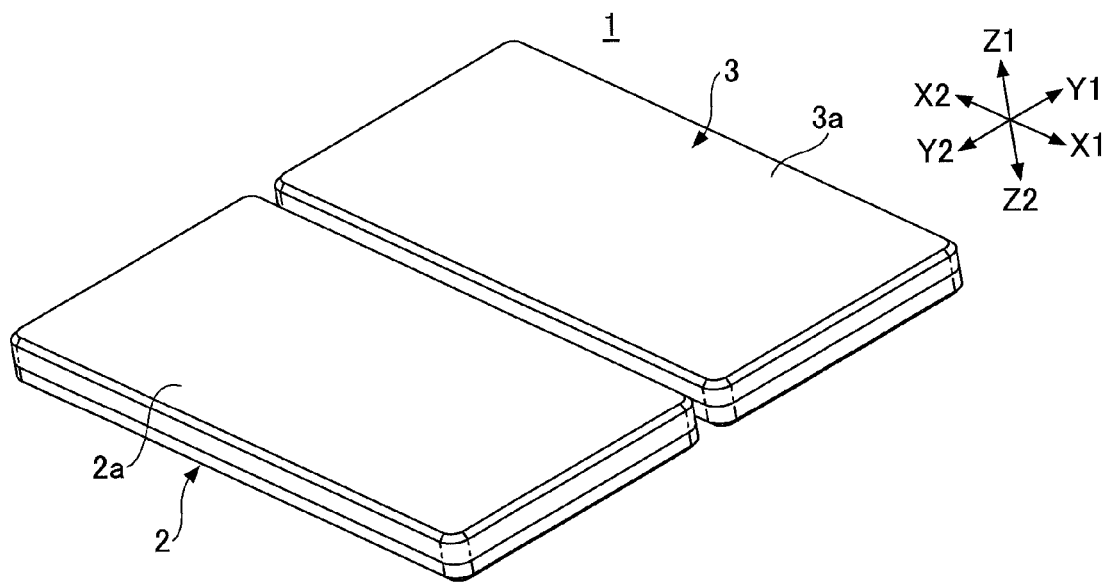
FIG. 10A is a perspective view illustrating an open state of an electronic device.

The opening/closing mechanism 10, which is assembled to, for example, an electronic device 1 including a first housing 1 and a second housing 2 (as illustrated in FIG. 8A), has a function of opening and closing the second housing 3 relative to the first housing 2 between an overlapped state (as illustrated in FIG. 8A) and a fully flat state (as illustrated in FIG. 10A and hereinafter referred to as an "open state"). Next, a configuration of the opening/closing mechanism 10 is described with reference to mainly FIGS. 1 and 2.

The opening/closing mechanism 10 according to this embodiment has a configuration including, for example, a fixed plate 20, a moving plate 30, an intermediate member 40, a slide member 50, a raising/lowering mechanism 60, a shaking prevention mechanism 70, and a torsion spring 80.

The fixed plate 20 is fixed to the first housing 2 on a fixing side of the electronic device 1. The fixed plate 20, which is formed by press-working a metal plate (e.g., stainless steel), has a configuration in which a main body part 21 and a C-shaped arm 22 are integrally formed.

The main body part 21 is planar part extending in directions X1 and X2 in the drawings. First slide stoppers 23 are formed on both side parts of the main body part 21. The first slide stopper 23 moves in cooperation with a stopper pawl 45 of the below-described intermediate member 40 and restricts sliding of the intermediate member 40 relative to the fixed plate.

Further, spring fixing holes 27 are formed in a pair of projecting parts formed in the vicinity of the center of the main body part 21 in the Y2 direction. Further, a fixing hole 26 (to which a fixing screw (not illustrated) is inserted for fixing the fixed plate 20 to the first housing 2) is formed in a predetermined area of the main body part 21.

Figure 4A:
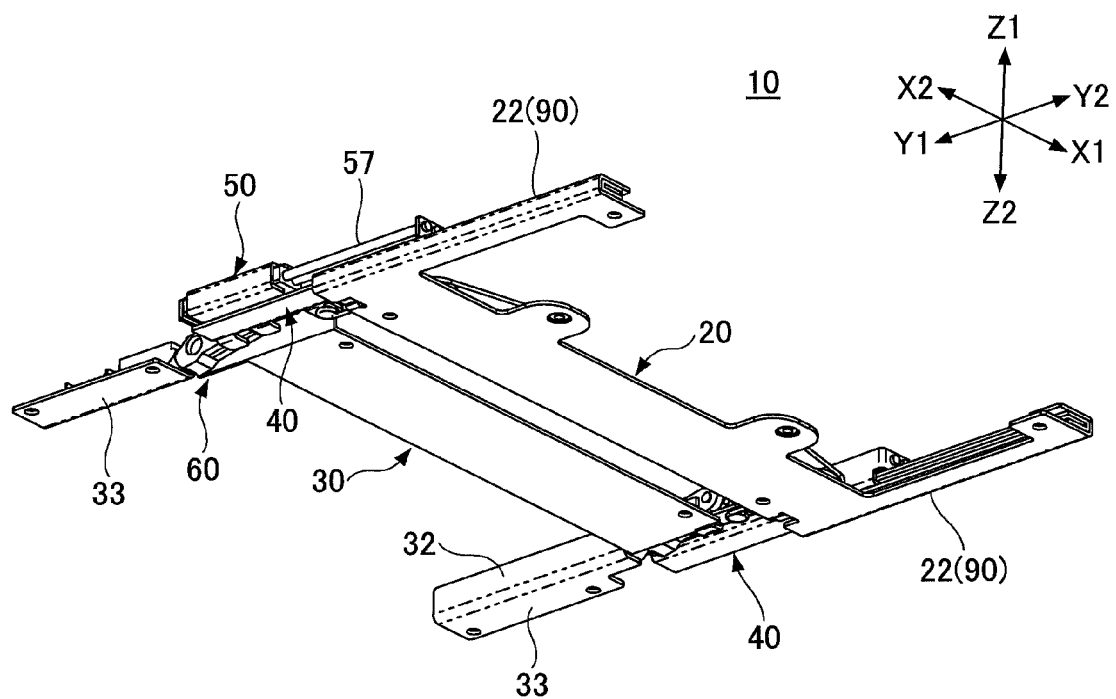
FIG. 4A is a perspective view of an open state of an opening/closing mechanism when viewed from below according to an embodiment of the present invention.
Figure 4B:
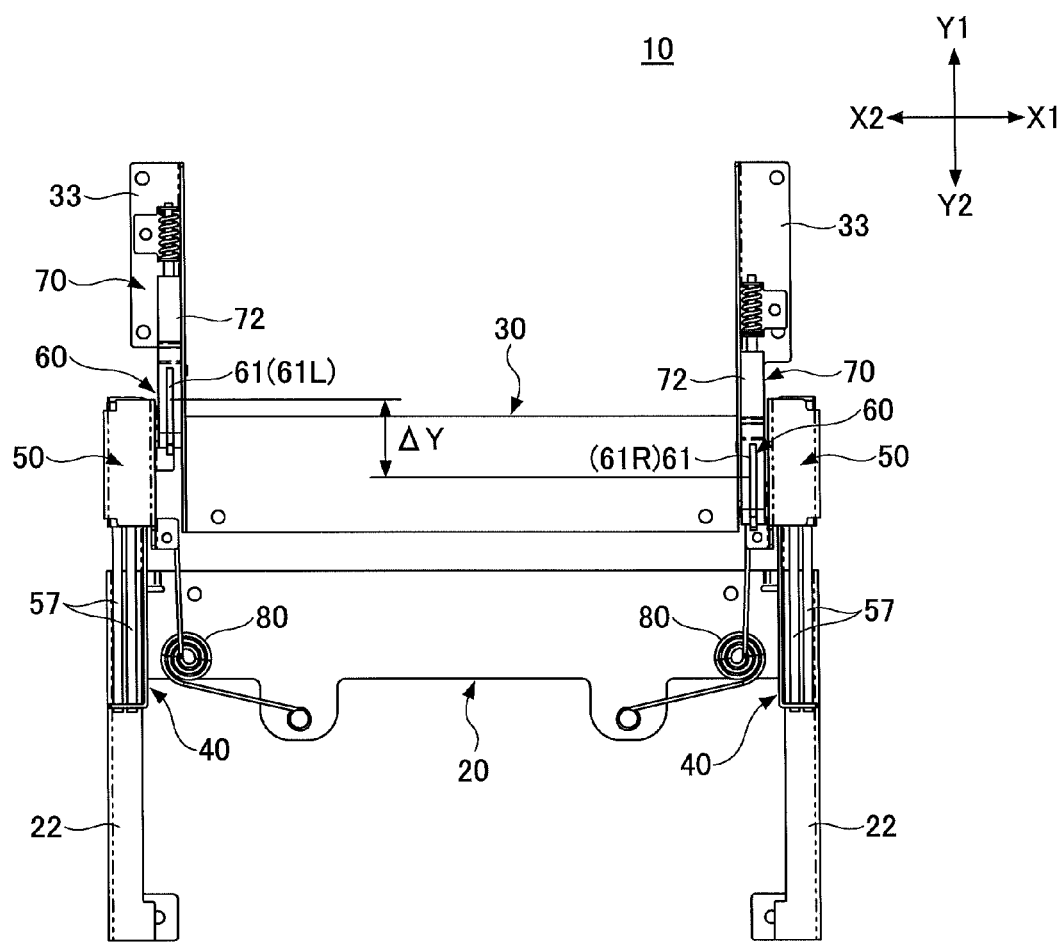
FIG. 4B is a plan view illustrating an open state of an opening/closing mechanism according to an embodiment of the present invention.
Figure 5:
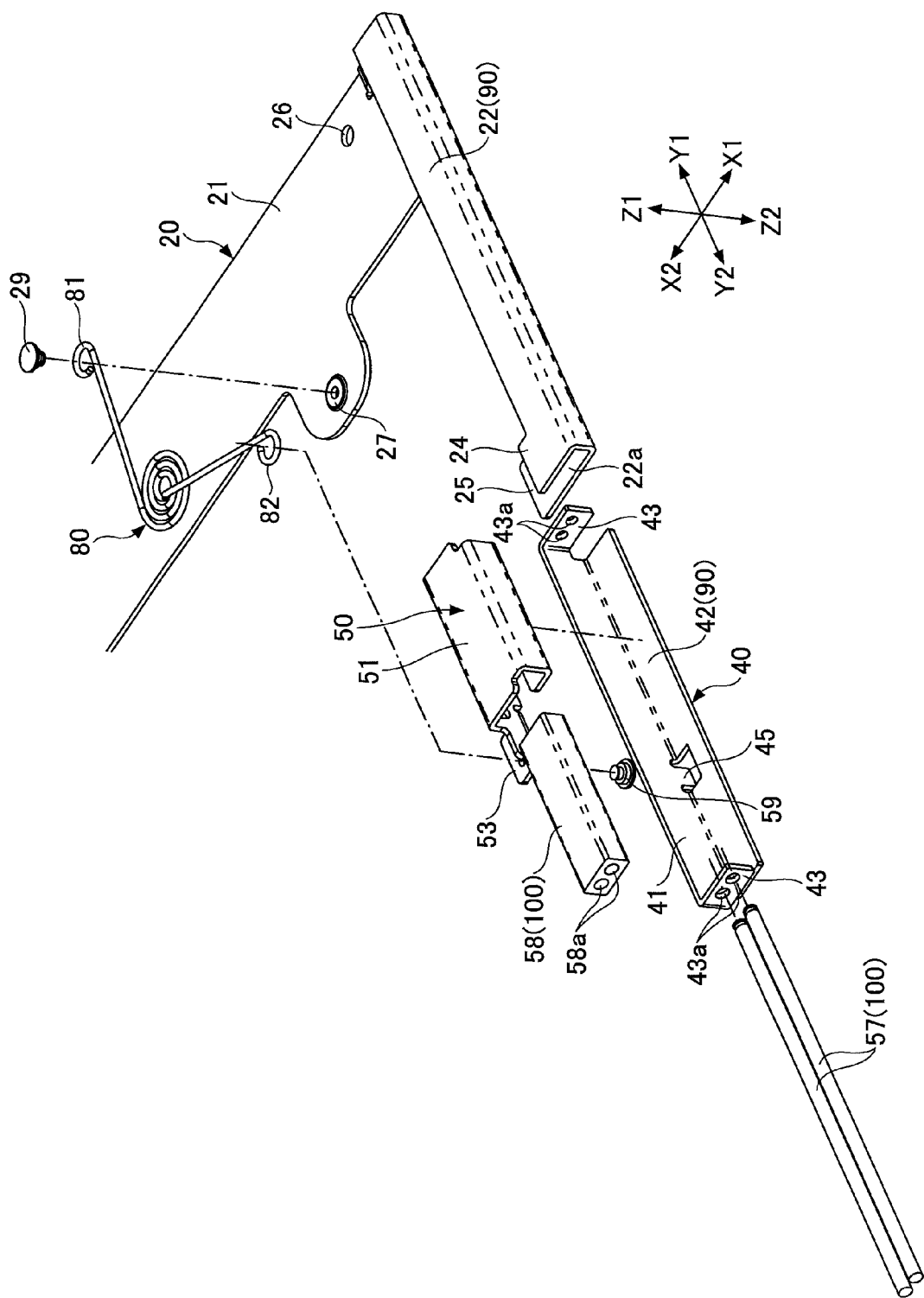
FIG. 5 is an exploded enlarged perspective view illustrating the vicinity of an intermediate member and a slide member.

The C-shaped arm 22 is formed on both side parts of the main body part 21 in a manner extending an arrow Y2 direction of the drawing. Further, as illustrated in FIGS. 4A, 4B, and 5, the C-shaped arm 22 is bent into a C-shape, so that a space part 22a (as illustrated in FIG. 5) is formed in its inner side. A guide member 28 is provided inside the space part 22a. The guide member 28 is fixed to the inside of the space part 22a by using, for example, an insert molding method.

The guide member 28 is formed by molding a resin material into a U-shape. Thereby, a slide groove 28a (illustrated in detail in FIG. 6), which extends in the arrow Y1, Y2 directions, is formed at a center portion of the guide member 28. The guide member 28 is preferred to be formed with a material having a low friction coefficient and a satisfactory wear resistance. Thus, in this embodiment, polyacetal (POM), which has a low friction coefficient and a satisfactory wear resistance, is used as the material of the guide member 28.

Next, the moving plate 30 is described. The moving plate 30 is fixed to the second housing 3 of the moving side of the electronic device 1. Similar to the fixed plate 20, the moving plate 30 is also formed by press-working a metal plate (e.g., stainless steel). The moving plate 30 has a configuration in which a main body part 31, an extending arm 32, a horizontal extending part 33 are integrally formed.

The main body part 31 is a plate-like member extending X1, X2 directions in the drawing. A fixing hole 34 (to which a fixing screw (not illustrated) for fixing the moving plate 30 to the second housing 3 is inserted) is formed in a predetermined area of the main body part 31.

The extending arm 32 is formed on both sides of the main body part 31. The extending arm 32 is provided to the main body part 31 in a manner extending in the arrow Y1 direction in the drawing. The extending arm 32 is bent in a right angle relative to the main body part 31. The extending arm 32 is formed having a shaft hole 36 to which a shaft pin 67 is attached for supporting the below-described raising/lowering arm 61.

The horizontal extending part 33 is formed in a manner horizontally extending outward by bending a part (a part toward the Y1 direction) of the extending arm 32 in a right angle. The fixing hole 34 is also formed in a predetermined area of the horizontal extending part 33. A fixing screw (not illustrated) is inserted to the fixing hole 34 for fixing the moving plate 30 to the second housing 3. The below-described shaking prevention mechanism 70 is formed in the horizontal extending part 33.

Next, the intermediate member 40 is described. The intermediate member 40 formed by integrally molding a metal plate (e.g., stainless steel). The intermediate member 40 has a configuration including, for example, a base part 41, a slide part 42, a shaft fixing part 43, and a stopper pawl 45 as illustrated in FIGS. 1-4A, 4B, and 5.

The base part 41 is a plate member standing orthogonally and extending in a sliding direction (arrows Y1, Y2 directions in the drawing). The slide part 42 is formed at a bottom part of the base part 41 by bending the bottom part in a right angle. The slide part 42 extends in a horizontal direction. Similar to the base part 41, the slide part 42 has a configuration extending in Y1, Y2 directions.

A Y1 direction end part and a Y2 direction end part of the base part 41 form the shaft fixing part 43 by bending a portion of the Y1, Y2 direction end parts of the base part 41. The shaft fixing parts 43 formed on both end parts of the base part 41 are configured facing each other. The shaft fixing parts 43 are configured to separate from the slide part 42 in the direction of arrows Z1, Z2 in the drawing.

A shaft hole 43a is formed in each of the shaft fixing parts 43. The below-described slide shaft 57 is attached to the shaft fixing part by being inserted through the shaft hole 43a.

The stopper pawl 45 has a configuration in which a portion of the shaft fixing part 43 is faced downward and lanced (cut and lifted). Thereby, the stopper pawl 45 is configured projecting downward (Z2 direction) from a bottom surface of the slide part 42.

The intermediate member 40 having the above-described configuration is slidably coupled to the fixed plate 20 by way of a first slide mechanism 90. The first slide mechanism 90 includes, for example, the C-shaped arm 22 of the fixed plate 20, the guide member 28, and the slide part 42 of the intermediate member 40.

As described above, the guide member 28 is provided in the C-shaped arm 22, and the slide groove 28a is formed in the guide member 28 in a manner extending in Y1, Y2 directions. The slide part 42 formed in the intermediate member 40 is inserted to the slide groove 28a of the guide member 28. In doing so, the shaft fixing part 43 does not contact the C-shaped arm 22 because the shaft fixing part 43 and the slide part 42 are separated from each other.

Figure 6:
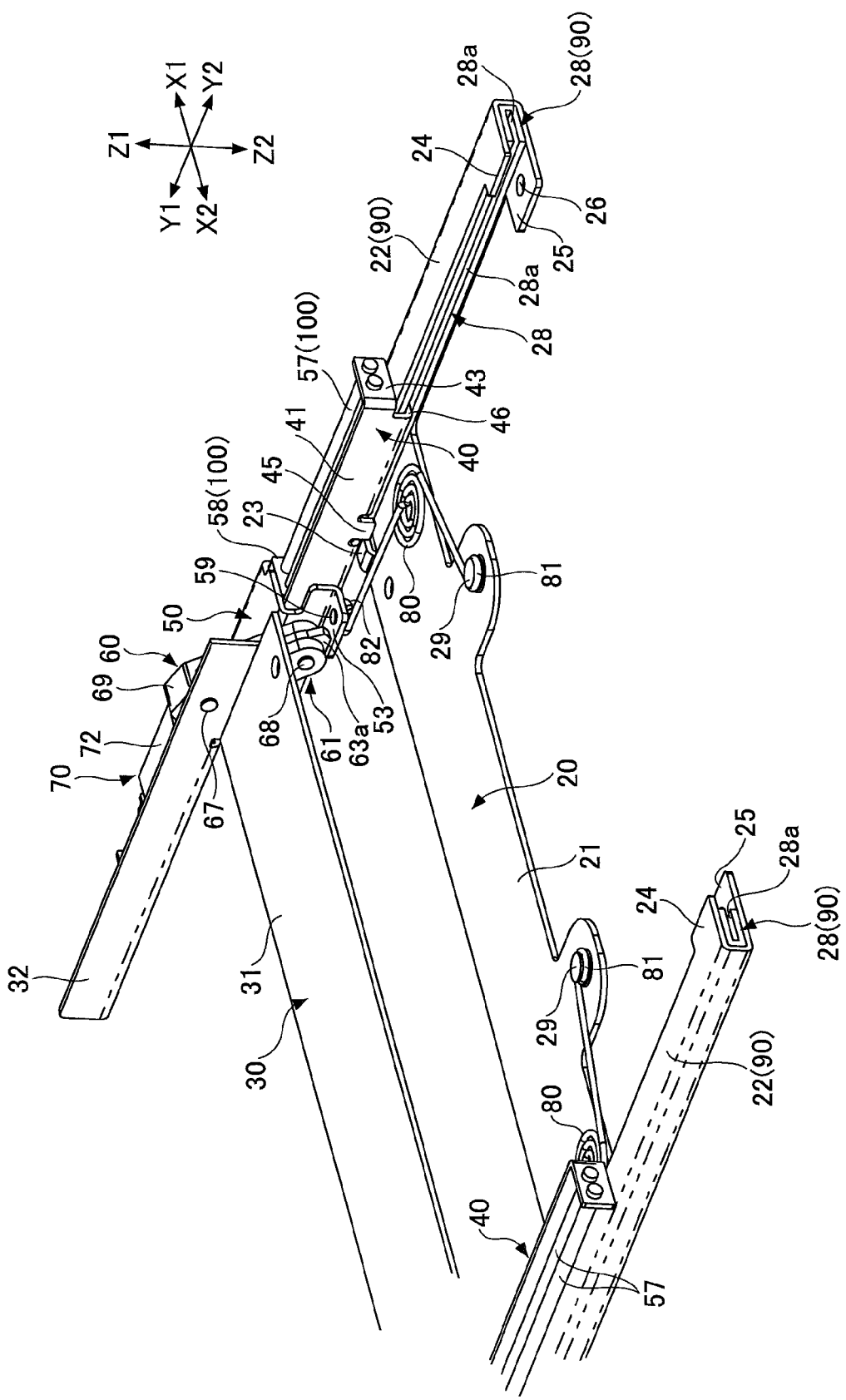
FIG. 6 is an enlarged perspective view illustrating the vicinity of an intermediate member and a slide member when viewed from inside.

FIG. 6 illustrates a state where the slide part 42 of the intermediate member 40 is inserted to the slide groove 28a of the guide member 28 mounted to the C-shaped arm 22. As described above, the guide member 28 is formed of a resin material having low friction coefficient and satisfactory wear-resistance. Therefore, the intermediate member 40 is has a configuration capable of sliding in a sliding direction (Y1, Y2 directions) along the fixed plate 20 (C-shaped arm 22) by way of the first slide mechanism 90.

Accordingly, the intermediate member 40 slides in the Y1, Y2 directions along the C-shaped arm 22. The sliding (in the Y1 direction) of the intermediate member 40 is restricted by having the stopper pawl 45 of the intermediate member 40 contact the first slide stopper 23 of the fixed plate 20 (main body part 21) (see FIG. 6).

Figure 8B:
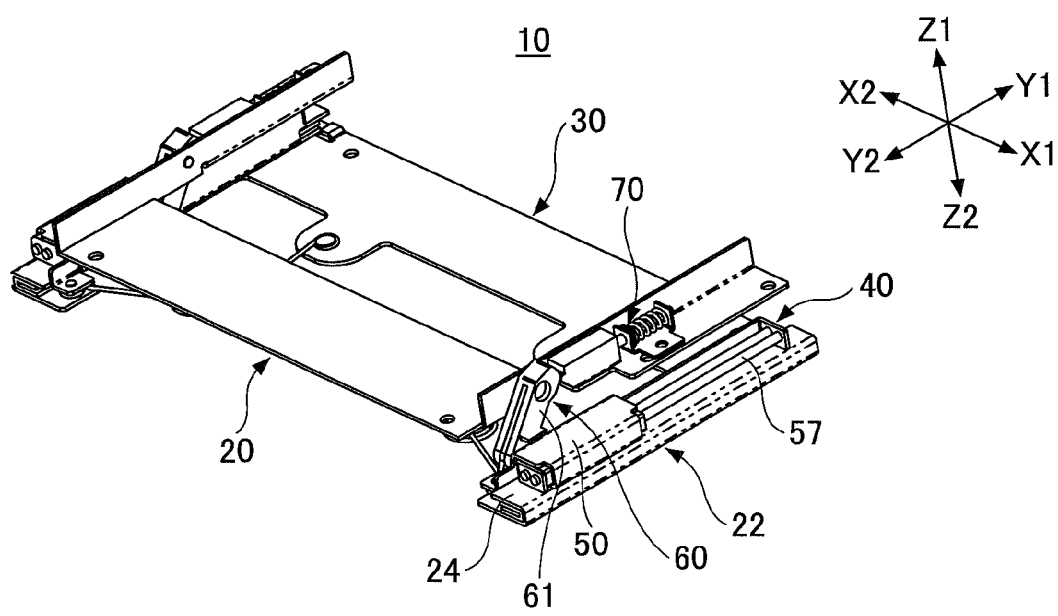
FIG. 8B is a perspective view of a closed state of an opening/closing mechanism.

Further, the sliding (in the Y2 direction) of the intermediate member 40 is restricted by having a step part (see FIGS. 1 and 6, the step part is hereinafter referred to as "stopper part 46" and is formed between the shaft fixing part 43 of a Y2 direction end part of the intermediate member 40) contact the second slide stopper 24 of a Y2 direction end part of the C-shaped arm 22. FIG. 8B illustrates a state where the sliding (Y2 direction) of the intermediate member 49 is restricted by the stopper part 46 contacting the second slide stopper 24.

Next, the slide member 50 is described. The slide member 50 is formed by integrally molding a metal plate (e.g., stainless steel). The slide member 50 includes, for example, a main body part 51, a bottom plate part 52, and a rotation stopper 53 as illustrated in FIGS. 1-4A, 4B, 5, and 7.

The main body part 51 is shaped as a rectangular parallelepiped having side parts that are open toward the Y1, Y2 arrow directions. The guide member 58 is mounted to the inside of the main body part 51. The guide member 58 is fixed to the inside of the main body part 51 by using, for example, an insert molding method.

The guide member 58 is formed by molding a resin material into a rectangular parallelepiped. The slide member 58 is bored to form two shaft holes 58a extending in the sliding direction (Y1, Y2 directions). The below-described slide shaft 57 is inserted to the shaft hole 58a to be slidable therein. The guide member 58 is preferred to be formed of a material having a low friction coefficient and a high wear-resistance. In this embodiment, POM is used as the material of the guide member 28.

Figure 7:
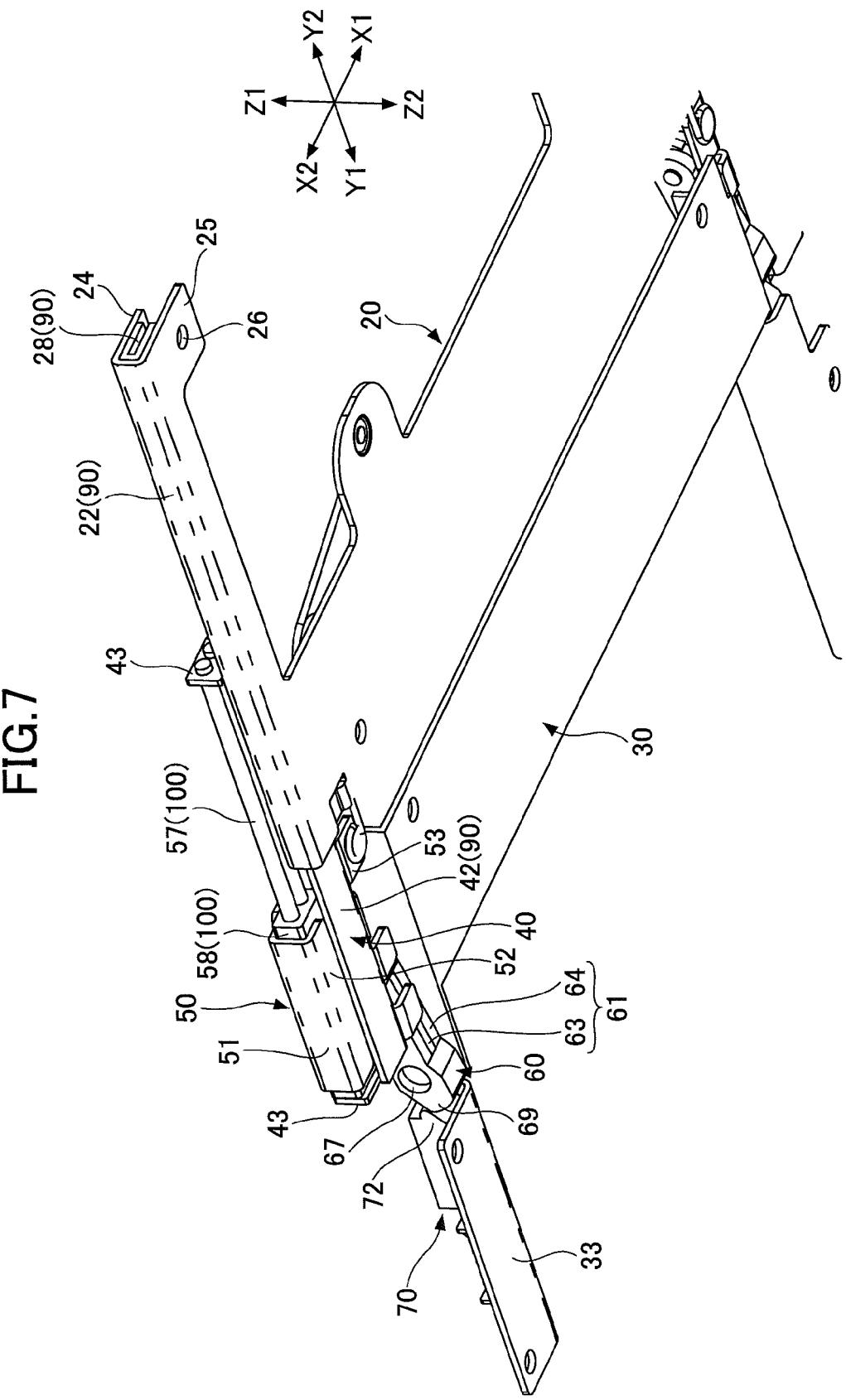
FIG. 7 is an enlarged perspective view the vicinity of an intermediate member and a slide member when viewed from below.

The bottom plate part 52 is formed at a bottom part of an outer sidewall of the main body part 51 in a manner horizontally extending inward (see FIG. 7). Because the bottom plate part 52 supports the bottom surface of the slide member 50, the guide member 58 can be positively retained in the slide member 50.

Further, a shaft support hole 55 is formed in the inner sidewall of the main body 51. The shaft pin 67, which bears an upper part of the below-described raising/lowering arm 61 (part of the raising/lowering mechanism 60), is fixed to the shaft support hole 55.

Further, the rotation stopper 53 is formed in a bottom part of the inner sidewall of the main body part 51 in a manner horizontally extending inward (see FIGS. 5-7). The rotation stopper 53 has an end part 82 of a torsion spring 80 attached thereto and functions as a stopper that restricts unnecessary rotation of the below-described raising/lowering arm 61. For the sake of convenience, the stopper function of the rotation stopper 53 is described below.

The slide member 50 having the above-described configuration is slidably coupled to the intermediate member 40 by way of a second slide mechanism 100. The second slide mechanism 100 has a configuration including, for example, the slide shaft 57 and the guide member 58.

As described above, the intermediate member 40 has shaft fixing parts 43 (bent outward in a right angle) on both side parts (in the Y1, Y2 directions) of the base part 41. The pair of shaft fixing parts 43 is configured to face each other. Each of the shaft fixing parts 43a has the shaft hole 43a formed therein.

The slide shaft 57 is attached to the shaft holes 43a of the pair of shaft fixing parts 43. Thereby, in a state where the slide shaft 57 is attached to the intermediate member 40, the slide member 50 is mounted to the slide shaft 57.

More specifically, in one assembly method, first, the slide member 50 having the guide member 58 fixed thereto is positioned between the pair of shaft fixing parts 43a of the intermediate member 40. Then, the slide shaft 57 is inserted from one of the rotation stoppers 53a (from the shaft fixing part 43 toward direction Y2 in the embodiment of FIG. 5) to the shaft hole 43a. Then, the slide shaft 57 (inserted to the shaft hole 43a) is further inserted to the shaft hole 58a of the guide member 58.

Then, the slide shaft 57 (projecting from the Y1 direction end part of the guide member 58) is inserted to the shaft hole 43a of the shaft fixing part 43 toward direction Y1. In this state, the shaft fixing part 43 and the slide shaft 57 are fixed to each other. It is to be noted that the method for the fixing is not in particular. Various methods such as welding or caulking may be used.

As described above, the guide member 58 is formed of a material having a low friction coefficient and a satisfactory wear-resistance. Further, the diameters of the slide shaft 57 and the shaft hole 58a are set with dimensions enabling the guide member 58 to slide along the slide shaft 57. Accordingly, the slide member 50 is slidably coupled to the intermediate member 40 by way of the second slide mechanism (slide shaft 57, guide member 58).

Next, the raising/lowering mechanism 60 is described. The raising/lowering mechanism 60 has a function of raising and lowering (moving in the directions of arrows Z1 and Z2) the moving plate 30 relative to the slide member 50. The raising/lowering mechanism 60 has a pair of raising/lowering arms 61 provided on both side parts of the moving plate 30.

The raising/lowering arm 61 includes a metal arm part 63 and a resin arm part 64. The metal arm part 63 is provided inside a groove part 65 of the resin arm part 64. The raising/lowering mechanism 61 may have the metal arm part 63 insert-molded thereto during the molding of the resin arm part 64. Alternatively, the metal arm part 63 and the resin arm part 64 may be assembled after being formed separately.

The raising/lowering arm 61 has shaft holes (through which shaft pins 67, 68 are inserted) at the vicinity of its upper and lower end parts. After the shaft pin 67 is inserted through the shaft hole of the upper end of the raising/lowering arm 61, the shaft pin 67 is fixed to the shaft hole 36 formed in the extending arm 32 of the moving plate 30. Thereby, the raising/lowering arm 61 is connected to the moving plate 30 in a state being rotatable about the shaft pin 67.

After the shaft pin 68 is inserted through the shaft hole of the lower end of the raising/lowering arm 61, the shaft pin 68 is fixed to the shaft hole 55 formed at an inner sidewall of the slide member 50. Thereby, the raising/lowering arm 61 is connected to the slide member 50 in a state being rotatable about the shaft pin 68.

Accordingly, by providing the raising/lowering arm 61 (having the lower end part rotatably connected to the slide member 50 and the upper end part rotatably connected to the moving plate 30) between the moving plate 30 and the slide member 50, the moving plate 30 can be raised and lowered relative to the slide member 50.

In this embodiment, the moving plate 30 is set to form an angle θ (illustrated in FIGS. 1 and 11A) less than or equal to 90 degrees (θ≤90°) relative to the horizontal direction of the raising/lowering arm 61 (Y1, Y2 directions). Accordingly, the rotation angle of the raising/lowering arm 61 is less than or equal to 90 degrees when the moving plate 30 is raised or lowered.

Further, in this embodiment, the positions for attaching the raising/lowering arms 61 to both side parts of the moving plate 30 are arranged in a manner deviated (shifted) in the sliding direction. Here, it is assumed that the raising/lowering arm 61 toward arrow direction X1 is "raising/lowering arm 61R" and the raising/lowering arm 61 toward arrow direction X2 is "raising/lowering arm 61L" (illustrated in FIGS. 2, 3B, 4B, and 11A-11C).

As illustrated in the drawings, the attachment position of the raising/lowering arm 61L is deviated (shifted) relative to the attachment position of the raising/lowering arm 61R in the arrow direction Y1 in the drawings. More specifically, the attachment position of the raising/lowering arm 61R and the attachment position of the raising/lowering arm 61L are separated for a distance of ΔY (as illustrated in the drawings) in the sliding direction.

With this embodiment, by shifting the positions of the raising/lowering arms 61 attached to both sides of the moving plate 30 (for supporting the moving plate 30 relative to the slide member 50), the moving plate 30 can be raised and lowered relative to the slide member 50 while maintaining a horizontal state by providing two raising/lowering arms 61 (raising/lowering arms 61R, 61L).

Here, it is supposed that the raising/lowering arms 61R, 61L are positioned without deviating (shifting) from each other. That is, it is supposed that ΔY=0 in a state illustrated FIGS. 2, 3B, 4B, and 11 (A). In this state, the raising/lowering arms 61R, 61L are in a superposed state from a side view. Therefore, the positions for connecting the raising/lowering arms 61R, 61L to the moving plate 30 become superposed. With this configuration, the moving plate 30 can freely rotate about the positions connected to the raising/lowering arms 61R, 61L. Thereby, the moving plate 30 becomes significantly unstable.

On the other hand, with this embodiment, the attachment position of the raising/lowering arm 61L is deviated (shifted) with respect to the attachment position of the raising/lowering arm 61R. Thus, the position at which the raising/lowering arm 61R is connected to the moving plate 30 and the position at which the raising/lowering arm 61L is connected to the moving plate 30 are deviated (shifted) from each other.

Accordingly, the moving plate 30 is restricted from rotating relative to the raising/lowering arms 61R, 61L. In a case of raising or lowering the moving plate 30 by rotating the raising/lowering arms 61R, 61L, the moving plate 30 is raised or lowered while maintaining a horizontal state. Thus, with this embodiment, the moving plate 30 can be stably raised and lowered while maintaining a horizontal state by providing with few components (i.e. two raising/lowering arms 61R, 61L).

In this embodiment, the number of components are reduced and the movement of the moving plate 30 is stabilized by providing one raising/lowering arm 61R, 61L to each side part of the moving plate 30 and deviating (shifting) their attachment positions. However, the method for attaching the raising/lowering arms 61 is not limited to that described above. For example, the raising/lowering of the moving plate 30 may be stabilized by providing multiple raising/lowering arms on both sides of the moving plate 30.

Next, the shaking prevention mechanism 70 is described. As described above, the raising/lowering mechanism 60 raises and lowers the moving plate 30 relative to the slide member 50. The shaking prevention mechanism 70 has a function of preventing the moving plate 30 from shaking by restricting unnecessary displacement of the moving plate 30 when in an open or a closed state.

More specifically, in a case where the first and second housings 2 and 3 are open to become a full-flat state (a state where an upper surface 2a of the first housing 2 is flush with an upper surface 3a of the second housing 3) as the moving plate 30 is lowered, the shaking prevention mechanism 70 has a function of, for example, restricting rotation of the raising/lowering arm 61.

The shaking prevention mechanism 70 includes a bracket 71, a second cam part 72, a spring 73, and a shaft 74 along with the first cam part 69 of the raising/lowering arm 61 and the rotation stopper 53 of the slide member 50.

The bracket 71, which is formed by bending a metal plate 71, supports the shaft 74. The bracket 71 is fixed to the horizontal extending part 33 of the moving plate 30. The spring 73 is inserted through the shaft 74 (to which a washer 75 is mounted) and attached to the bracket 71.

Further, the second cam part 72 is fixed to a Y2 direction end part of the shaft 74. The spring 73 is configured having an elastic force that urges the shaft 74 in the arrow Y2 direction. Thereby, the second cam part 72 is urged in the arrow Y2 direction by the elastic force of the spring 73.

The first cam part 69 is formed in the resin arm part 64 of the raising/lowering arm 61. More specifically, the first cam part 69 is formed in an upper end part of the resin arm part 64. The first cam part 69 includes a curved part 69a (having a curved shape) and a flat part 69b (having a flat shape) (see FIGS. 11A, 11B, 11C).

As illustrated in FIG. 1, the first cam part 69 and the second cam part 72 are configured facing each other. Further, as described above, because the second cam part 72 is urged in the arrow Y2 direction by the spring 73, a tip part of the second cam part 72 is pressed against the first cam part 69.

Figure 11A:
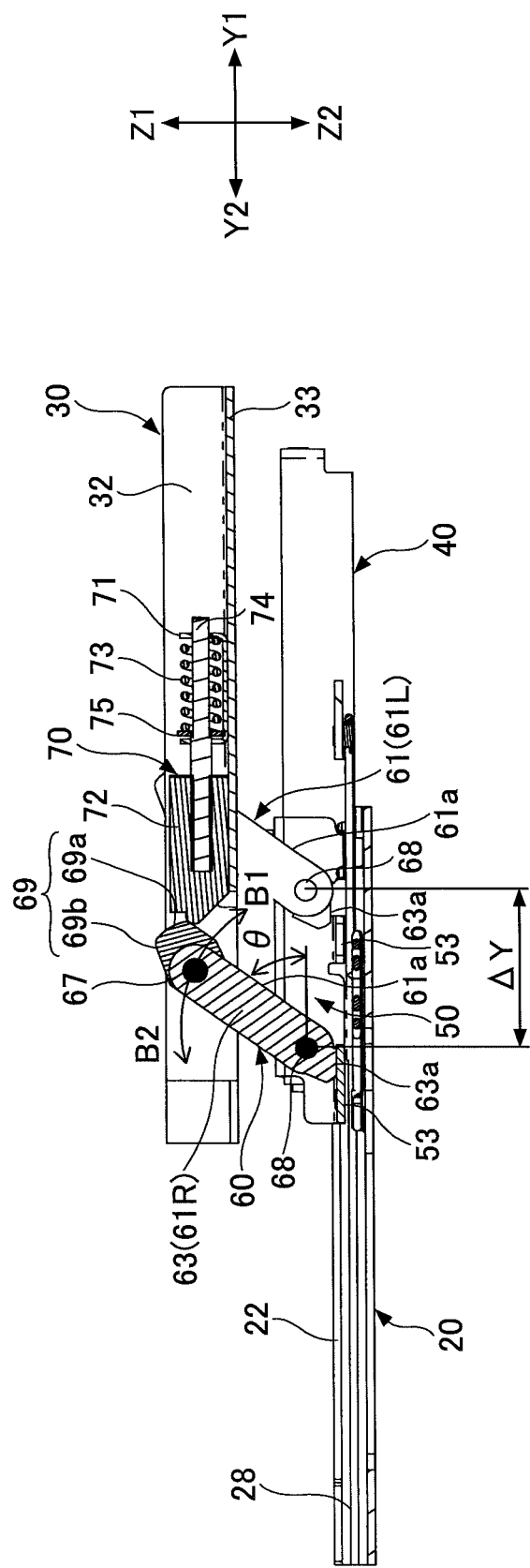
FIG. 11A is a diagram for describing a raising/lowering mechanism and a shaking prevention mechanism in a closed state.
Figure 11B:
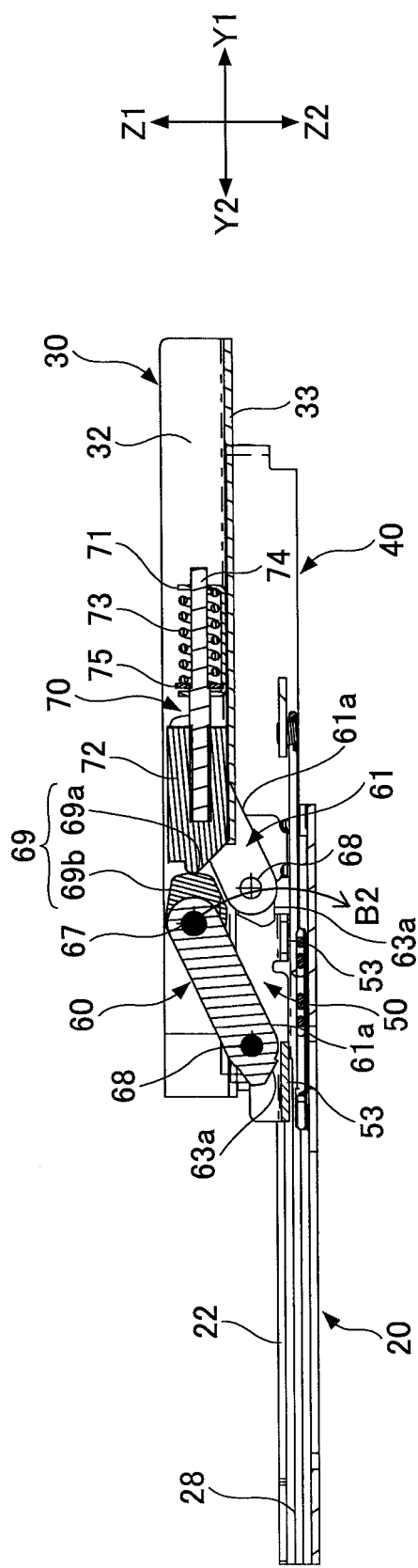
FIG. 11B is a diagram for describing a raising/lowering mechanism and a shaking prevention mechanism in a slide-completed state.

On the other hand, a lower end part of the metal arm part 63 of the raising/lowering arm 61 has the resin arm part 64 exposed therefrom. The part of the metal arm part 63 exposed from the resin arm part 64 includes a lower end flat part 63a as illustrated in FIGS. 11A, 11B, and 11C. The lower end flat part 63a contacts an upper surface of the rotation stopper 53 (surface contact) in a state where the moving plate 30 is raised (see FIGS. 6 and 11A).

Next, the torsion spring 80 is described. As described above, the torsion spring 80 has one end part 81 fixed to the fixed plate 20 by using a spring fixing screw 29. Further, the other end part 82 of the torsion spring 80 is fixed to the slide member 50 by using a spring fixing screw 59. Thereby, the torsion spring 80 is arranged between the fixed plate 20 and the slide member 50.

As described above, the opening/closing mechanism 10 of this embodiment has the intermediate member 40 being slidably coupled to the fixed plate by way of the first slide mechanism 90 and the slide member 50 being slidably coupled to the intermediate member 40 by way of the second slide mechanism 100. Thus, by arranging the torsion spring 80 between the fixed plate 20 and the slide member 50, both the intermediate member 40 and the slide member 50 can be resiliently urged with respect to the fixed plate 20.

With the configuration according to this embodiment, the number of components can be reduced because there is no need to provide a resilient urging member between the fixed plate 20 and the intermediate member 40 and between the intermediate member 40 and the slide member 50.

Further, the torsion spring 80 according to this embodiment urges the slide member 50 in the arrow Y2 direction in a case where the fixed plate 20 is positioned in a closed state. Further, the one end part 81 and the other end part 82 of the torsion spring 80 become closer to each other as the slide member 50 moves in the Y1 direction. In a case where the end parts 81, 82 are positioned beyond a point where the end parts 81, 82 are horizontally arranged in the X1, X2 directions, the torsion spring 80 urges the slide member 50 in the arrow Y1 direction. Thereby, the opening/closing mechanism 10 of this embodiment is configured as an opening/closing mechanism having a so-called semi-automatic mechanism.

Next, the movement of the opening/closing mechanism 10 having the above-described configuration is described with reference to mainly FIGS. 8A, 8B, 8C-11A, 11B, and 11C.

Figure 8C:
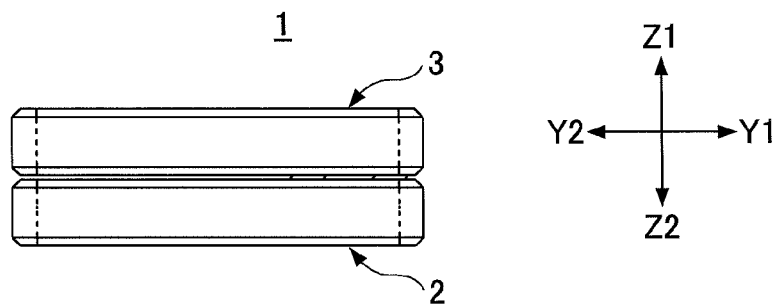
FIG. 8C is a side view of a closed state of an electronic device.

FIGS. 8A, 8B, and 8C illustrate the opening/closing mechanism 10 in a closed state and the electronic device 1 using the opening/closing mechanism 10. In the closed state, the second housing 3 is in a state superposed on an upper part of the first housing 2 as illustrated in FIGS. 8A and 8C.

As described above, in a case where the fixed plate 20 is in the position of the closed state, the slide member 50 is urged to the fixed plate 20 in the arrow Y2 direction by the urging force of the torsion spring 80. Thereby, the slide member 50 slides in the arrow Y2 direction by way of the second slide mechanism 100 and contacts the shaft fixing part 43 of the intermediate member 40.

In this state, the urging force of the torsion spring 80 is transmitted to the intermediate member 40, so that the intermediate member 40 is urged in the arrow Y2 direction. Although the intermediate member 40 is caused to slide in the arrow Y2 direction by the first slide mechanism 90, the stopper part 46 restricts the sliding by contacting the second slide stopper 24.

Further, the raising/lowering arm 61 of the raising/lowering mechanism 60 is in a state rotated in a counter-clockwise direction (arrow B2 direction in FIG. 11A) by pressing the second cam part 72 of the shaking prevention mechanism 70 against the first cam part 69. Thereby, the moving plate 30 is raised.

Accordingly, in the state where the moving plate 30 is raised, the lower end flat part 63a (formed at the lower end part of the metal arm part 63 of the raising/lowering arm 61) contacts the upper surface of the rotation stopper 53 (see FIGS. 6 and 11A). Thus, by having the surface of the lower end flat part 63a contact the surface of the rotation stopper 53, the raising/lowering arm 61 is restricted from rotating in the counter-clockwise direction (arrow B2 direction of FIGS. 11A and 11C). Thereby, the moving plate 30 is restricted from moving in the Y2 direction from the closed state.

Accordingly, the second housing 3 can be prevented from moving in the arrow Y2 direction from a state where the first housing 2 and the second housing 3 are superposed as illustrated in FIGS. 8A and 8B. Further, shaking between the first housing 2 and the second housing 3 can be prevented.

In a case where the moving plate 30 (second housing 3) is opened from the closed state, the moving plate 30 (second housing 3) is slid in the arrow Y1 direction. Thereby, the first slide mechanism 90 causes the intermediate member 40 to slide in the Y1 direction relative to the C-shaped arm 22, and the second slide mechanism 100 causes the slide member 50 to slide in the Y1 direction relative to the intermediate member 40. It is to be noted that the sliding of the intermediate member 40 and the sliding of the slide member 50 are performed substantially simultaneously.

The torsion spring 80 is arranged to constitute the above-described semi-automatic mechanism. Accordingly, when and after the moving plate 30 surpasses a position in which the end parts 81, 82 of the torsion spring 80 are horizontally arranged in the X1, X2 directions, the elastic force of the torsion spring 80 causes the moving plate 30 (slide member 50) to automatically slides in the Y1 direction.

Figure 9A:
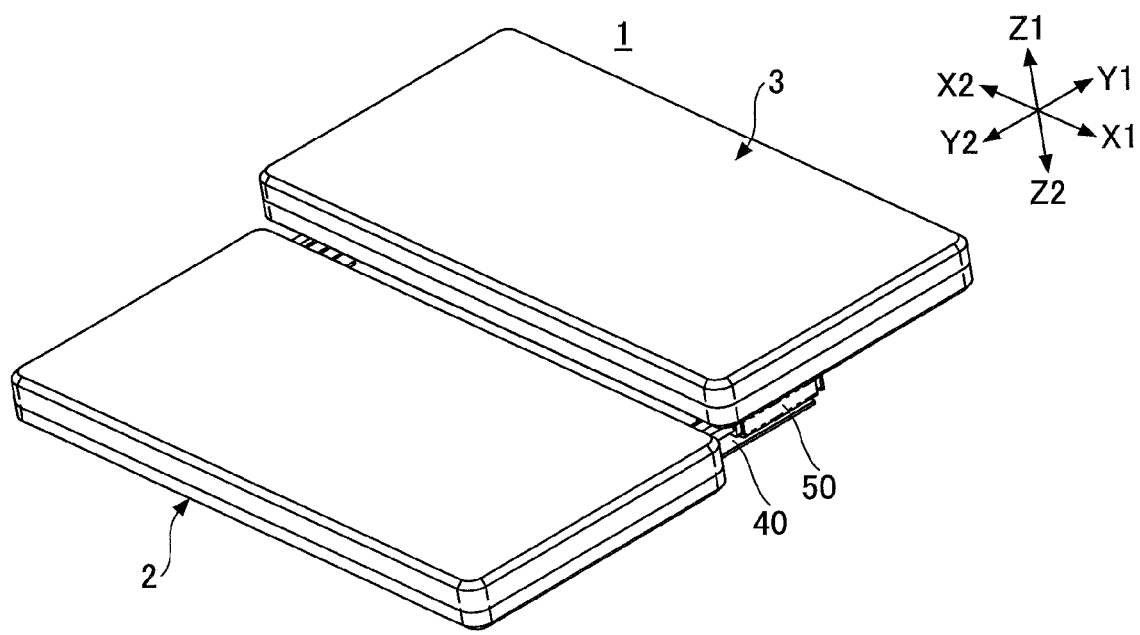
FIG. 9A is a perspective view illustrating a slide-completed state of an electronic device.
Figure 9B:
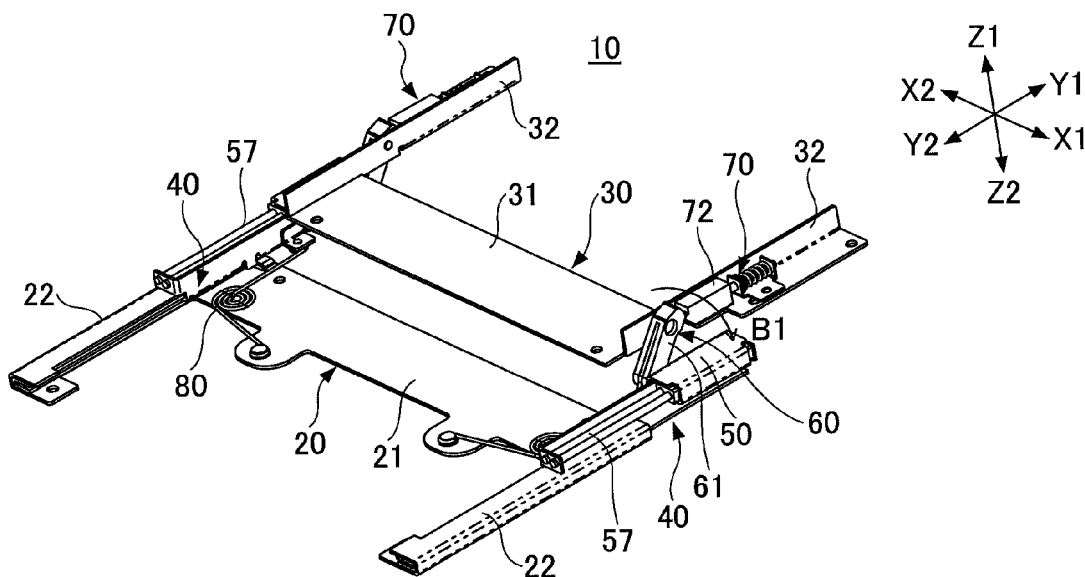
FIG. 9B is a perspective view of a slide-completed state of an opening/closing mechanism.
Figure 9C:
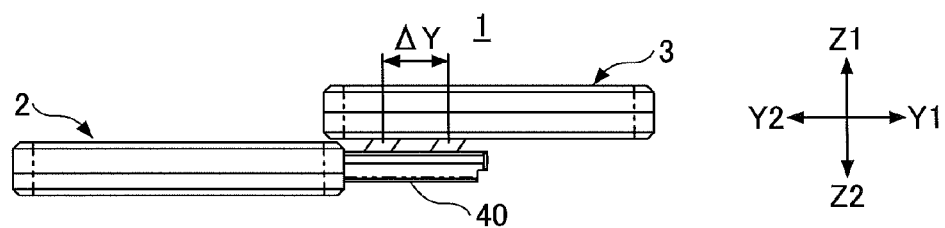
FIG. 9C is a side view of a slide-completed state of an electronic device.

FIGS. 9A, 9B, and 9C illustrate a state where the intermediate member 40 and the slide member 50 have slid to the limit of moving in the Y1 direction (this state is hereinafter referred to as "slide-completed state"). In this slide-completed state, the intermediate member 40 is restricted from moving in the Y1 direction by the stopper pawl 45 contacting the first slide stopper 23. Further, the slide member 50 is restricted from moving in the Y1 direction by the Y1 direction end part of the slide member 50 contacting the shaft fixing part 43 toward the Y1 direction of the intermediate member 40.

However, the second housing 3 remains superposed on the upper part of the first housing 2 from the closed state to the slide-completed state. Further, the raising/lowering arm 61 is urged in the above-described counter-clockwise direction by the second cam part 72. Thereby, the raising/lowering arm 61 is prevented from rotating in the clockwise direction (B1 direction). Accordingly, the moving plate 30 is maintained at the raised position. Thus, the second housing 3 can horizontally slide without moving in the vertical direction (movement in directions Z1, Z2) between the closed state and the slide-completed state.

Next, the sliding distance of the sliding member 50 relative to the fixed plate 20 between the closed state and the slide-completed state is observed. In this embodiment, the intermediate member 40 slides in the Y1 direction relative to the fixed plate 20 by way of the first slide mechanism 90, and the slide member 50 slides in the Y1 direction relative to the intermediate member 40 by way of the second slide mechanism 100.

In a case where the sliding distance of the intermediate member 40 relative to the fixed plate 20 is "L1" and the sliding distance of the slide member 50 relative to the intermediate member 40 is "L2", the slide distance L of the slide member 50 relative to the fixed plate 20 is "L=L1+L2". Thus, a long slide distance can be attained. Therefore, as illustrated in FIGS. 9A and 9C, the second housing 3 can be moved to a position that has no or hardly any part that is superposed with the first housing 2 in the slide-completed state.

Accordingly, because the second housing 3 cannot be supported by the first housing 2 when the second housing 3 has slid to the slide-completed position, the weight of the second housing 3 is applied to the raising/lowering mechanism 60. Therefore, the raising/lowering arm 61 begins to rotate in the clockwise direction (B1 direction) where the weight of the second housing 3 itself is used as a driving force. This is described by referring to FIGS. 11A, 11B, and 11C.

FIGS. 11A, 11B, and 11C illustrate the raising/lowering mechanism 60 and the shaking prevention mechanism 70 in the slide-completed state. In the state illustrated in FIG. 11A, the tip part of the second cam part 72 is in a state being pressed against the curved part 69a of the first cam part 69.

The resilient force of the spring 73 of the shaking prevention mechanism 70 is set to degree in which the raising/lowering arm 61 is allowed to rotate in the B1 direction when the weight of the second housing 3 itself is applied. Therefore, in the sliding (opening/closing) state, the raising/lowering arm 61 begins to rotate in the B1 direction, and the moving plate 30 begins to move downward in correspondence with the rotation.

As described above, the angle θ (illustrated in FIGS. 1 and 11A) of the raising/lowering arm 61 relative to the horizontal direction (Y1, Y2 directions) in the slide-completed state is set to be less than or equal to 90 degrees. Accordingly, the moving plate 30 does not include upward movement (Z1 direction) and only moves downward (Z1 direction) when the raising/lowering arm 61 is rotated in the B1 direction. Thereby, the movement of the second housing 3 relative to the first housing 2 can be stabilized.

FIG. 11B illustrates a state where the raising/lowering arm 61 is in the middle of rotating toward the open position. The above-described lower end flat part 63a is configured to restrict the rotation of the raising/lowering arm 61 in the counter-clockwise direction (B2 direction) but allow the raising/lowering arm 61 to rotate in the clockwise direction (B1 direction).

Figure 10B:
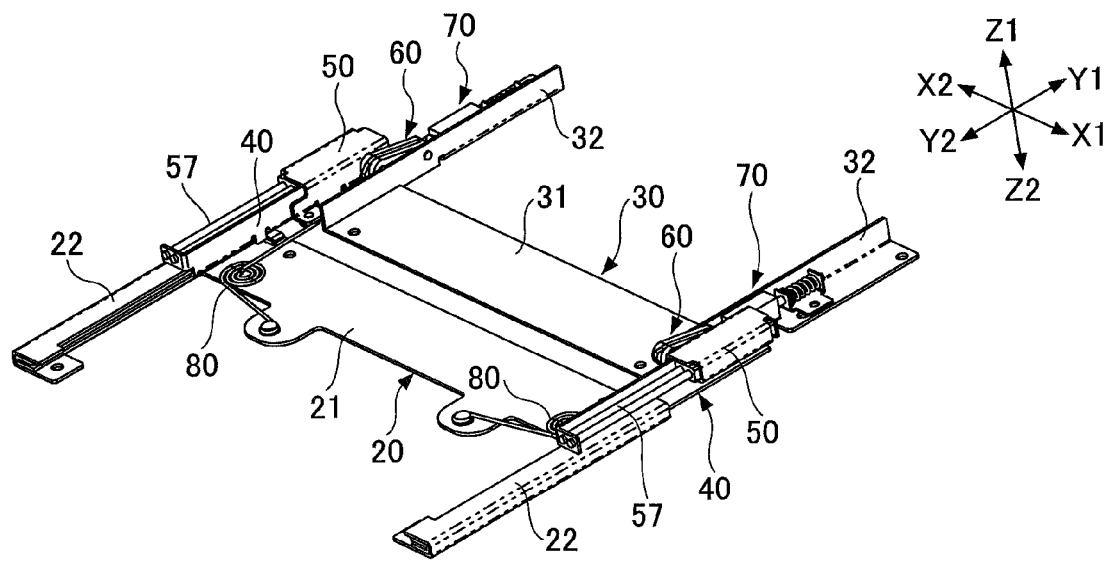
FIG. 10B is a perspective view of an open state of an opening/closing mechanism.
Figure 10C:
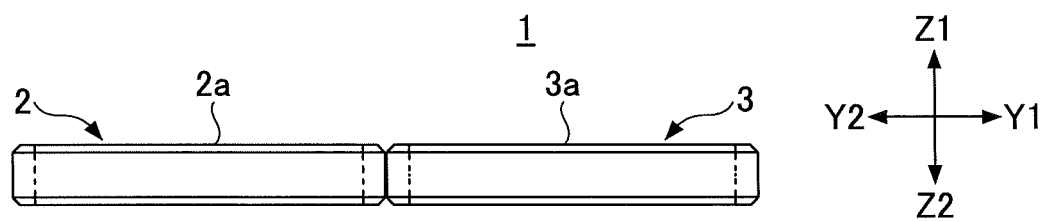
FIG. 10C is a side view of an open state of an electronic device.

FIGS. 10 and 11C illustrate a state where the moving plate 30 is lowered to the closed state. In this closed state, a side surface part 61a of the raising/lowering arm 61 contacts the rotation stopper 53 of the shaking prevention mechanism 70. By having the side surface part 61a engage (contact) the rotation stopper 53, the raising/lowering arm 61 is restricted from rotating further in the B1 direction (opening direction).

In a case where the raising/lowering arm 61 is rotated to the position of the closed state, the tip part of the second cam part 72 of the shaking prevention mechanism 70 overruns the curved part 69a of the first cam part 69 and engages the flat part 69b. Owing to the flat shape of the flat part 69b, the engagement of the flat part 69b and the second cam part 72 restricts the rotation of the raising/lowering arm 61 in the B2 direction (closing direction). Thereby, the shaking prevention mechanism 70 causes the moving plate 30 to become an engaged state without any shaking in the closed state.

It is to be noted that description of the movements of the components from the open state to the closed state is omitted because the movements are reverse relative to the transition of the above-described closed state to the open state.

With the opening/closing mechanism 10 according to the above-described embodiment, the superposed part between the first and the second housings 2 and 3 can be substantially eliminated in the slide-completed state because the sliding distance L of the slide member 50 relative to the fixed plate 20 can be increased. Accordingly, there is no need to provide a space in the first and second housings 2, 3 for enabling opening and closing movements. Thus, the efficiency of using the space in the first and second housings 2, 3 can be improved.

Further, in the opening/closing mechanism 10 of this embodiment, the second housing 3 (first housing 2) performs horizontal movement from the closed state to the slide-completed state. Accordingly, the sliding of the second housing 3 (first housing 2) does not include movement in the vertical direction (Z1, Z2 directions). Thus, the sliding of the second housing 3 (first housing 2) can be stabilized.

Further, the opening/closing mechanism 10 of this embodiment is configured to cause the intermediate member 40 to slide on the C-shaped arm 22 and the slide member 50 to slide on the intermediate member 40. Accordingly, the intermediate member 40 and the slide member 50, which slide relative to the fixed plate 20, are gathered to the upper part of the C-shaped arm 22. Thereby, size reduction of the opening/closing mechanism can be achieved in the width direction (X1, X2 directions).

Further, the present invention is not limited to these embodiments, but various variations and modifications may be made without departing from the scope of the present invention.

The present international application is based on Japanese Patent Application No. 2010-156781 filed on Jul. 9, 2010, the entire contents of which are incorporated herein by reference.

The invention claimed is:

1. An opening/closing mechanism comprising:
   a fixed plate that is fixed to a first housing;
   a moving plate that is fixed to a second housing;
   an intermediate member that is slidably coupled to the fixed plate by way of a first slide mechanism;
   a slide member that is slidably coupled to the intermediate member by way of a second slide mechanism; and
   a raising/lowering mechanism that raises/lowers the moving plate relative to the slide member.

2. The opening/closing mechanism as claimed in claim 1, wherein the raising/lowering mechanism includes an arm having one end part rotatably connected to the slide member and another end part rotatably connected to the moving plate, wherein the moving plate is configured to be raised/lowered by the arm being rotated less than or equal to 90 degrees.

3. The opening/closing mechanism as claimed in claim 2, further comprising:
   a shaking prevention mechanism including
      a first cam part that is provided toward the other end part of the arm,
      a second cam part that is arranged facing the first cam part, and
      a stopper provided in the slide member,
   wherein a movement of the moving plate relative to the slide member in a closing direction is restricted by an engagement of the first cam part and the second cam part, and a movement in an opening direction is restricted by an engagement of a part of the raising/lowering mechanism and the stopper,
   wherein a displacement of the moving plate relative to the slide member is restricted when an upper surface of the first housing and an upper surface of the second housing become flush as the moving plate is lowered.

4. The opening/closing mechanism as claimed in claim 1, further comprising:
   a shaking prevention mechanism that restricts displacement of the moving plate relative to the slide member when an upper surface of the first housing and an upper surface of the second housing become flush as the moving plate is lowered.

5. The opening/closing mechanism as claimed in claim 1, further comprising:
   an elastic urging part that is provided between the fixed plate and the slide member.

* * * * *